United States Patent
Straub et al.

(10) Patent No.: US 10,933,369 B2
(45) Date of Patent: Mar. 2, 2021

(54) GAS DEHYDRATION MEMBRANE MODULE WITH INTEGRAL FILTER

(71) Applicant: Generan IGS, Inc., Houston, TX (US)

(72) Inventors: Marc Straub, Brentwood, CA (US); Luis Brizuela, Antioch, CA (US); John A. Jensvold, Benicia, CA (US)

(73) Assignee: Generon IGS, Inc., Houston, TX (US)

( * ) Notice: Subject to any disclaimer, the term of this patent is extended or adjusted under 35 U.S.C. 154(b) by 375 days.

(21) Appl. No.: 15/989,749

(22) Filed: May 25, 2018

(65) Prior Publication Data

US 2019/0358581 A1    Nov. 28, 2019

(51) Int. Cl.
*B01D 53/22* (2006.01)
*B01D 53/04* (2006.01)
*B01D 53/26* (2006.01)

(52) U.S. Cl.
CPC ........... *B01D 53/229* (2013.01); *B01D 53/04* (2013.01); *B01D 53/268* (2013.01); *B01D 2053/224* (2013.01); *B01D 2253/102* (2013.01); *B01D 2257/708* (2013.01); *B01D 2257/80* (2013.01)

(58) Field of Classification Search
CPC .......... B01D 63/04; B01D 2053/224; B01D 53/268; B01D 53/229; B01D 53/04; B01D 2257/708; B01D 2257/80; B01D 2253/102
See application file for complete search history.

(56) References Cited

U.S. PATENT DOCUMENTS

| | | | |
|---|---|---|---|
| 3,735,558 A * | 5/1973 | Skarstrom | B01D 53/268 95/51 |
| 4,857,081 A * | 8/1989 | Taylor | B01D 17/085 95/52 |
| 5,525,143 A | 6/1996 | Morgan | |
| 6,001,249 A * | 12/1999 | Bailey | C02F 1/003 210/232 |
| 6,454,836 B1 * | 9/2002 | Koelmel | E21B 43/38 95/46 |
| 6,653,012 B2 * | 11/2003 | Suzuki | H01M 8/04119 429/413 |
| 6,746,513 B2 | 6/2004 | Anderson | |
| 7,294,174 B2 | 11/2007 | Coan | |
| 7,497,894 B2 | 3/2009 | Jeffers | |

(Continued)

FOREIGN PATENT DOCUMENTS

EP    1275432 A1    1/2003

OTHER PUBLICATIONS

Klemm et al. "Cellulose: Fascinating Biopolymer and Sustainable Raw Material" Wiley-VCH 2005, pp. 3358-3393 (Year: 2005).*

*Primary Examiner* — Anthony R Shumate

(74) *Attorney, Agent, or Firm* — William H. Eilberg

(57) ABSTRACT

An air dehydration module includes polymeric fibers for separating water vapor from air, and also includes a carbon filter material, positioned at an outlet end of the module, and within the same pressure vessel which houses the fibers. The module may generate its own sweep stream, in which case a portion of its output is directed to flow through an orifice, towards the inlet end of the module. In an alternative embodiment, the sweep gas is produced by a distinct gas-separation module, which receives an input stream from the output of the dehydration module. The dehydration module produces clean and dry air which can be used as is, or as an input stream to an air separation module.

12 Claims, 2 Drawing Sheets

(56) References Cited

U.S. PATENT DOCUMENTS

| | | | |
|---|---|---|---|
| 7,517,388 B2* | 4/2009 | Jensvold | B01D 53/22 210/321.8 |
| 7,578,871 B2* | 8/2009 | Jensvold | B01D 53/22 210/490 |
| 7,662,333 B2* | 2/2010 | Coan | B29C 41/14 264/511 |
| 8,038,960 B2* | 10/2011 | Higashino | C01B 3/384 422/198 |
| 8,398,755 B2 | 3/2013 | Coan | |
| 8,409,324 B1 | 4/2013 | Straub | |
| 9,034,957 B2* | 5/2015 | Jensvold | B01D 67/0011 524/104 |
| 9,061,249 B2* | 6/2015 | Evosevich | B01D 71/021 |
| 9,327,243 B2* | 5/2016 | Jojic | B01D 53/228 |
| 2003/0010205 A1* | 1/2003 | Bikson | B01D 46/521 95/52 |
| 2010/0264082 A1* | 10/2010 | Conner | C02F 3/1273 210/620 |
| 2016/0303507 A1* | 10/2016 | Jensvold | B01D 53/229 |

\* cited by examiner

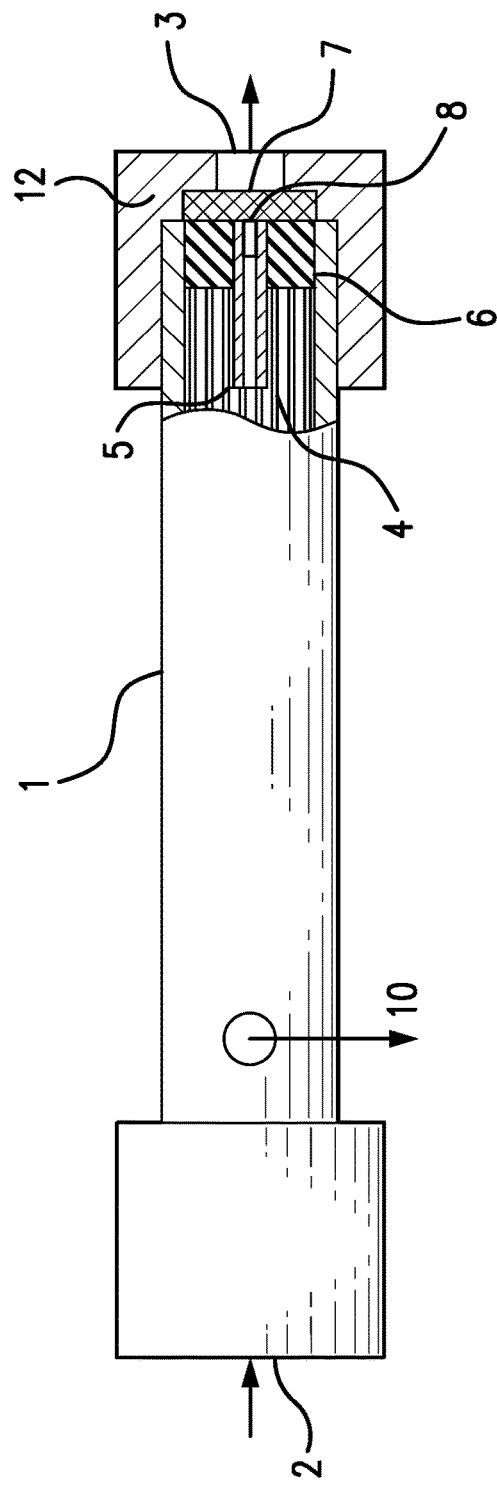
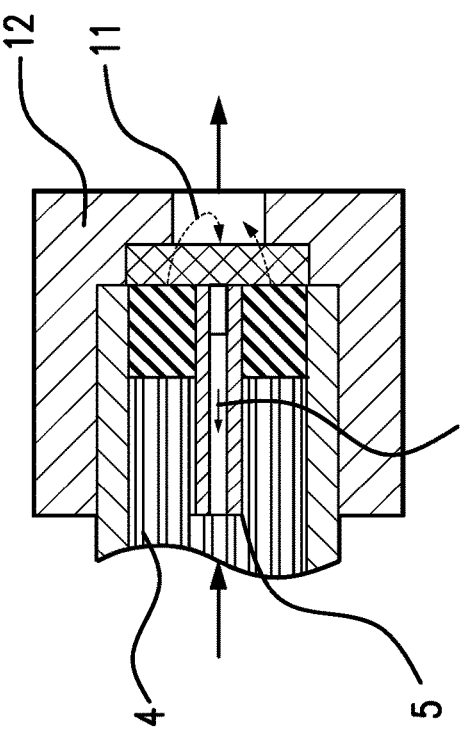

GAS DEHYDRATION MEMBRANE MODULE WITH INTEGRAL FILTER

BACKGROUND OF THE INVENTION

The present invention relates to a membrane-based module for non-cryogenic dehydration of a gas, such as air.

It has been known to use a polymeric membrane to separate gases into components. Various polymers have the property that they allow different gases to flow through, or permeate, the membrane, at different rates. A polymer used in air separation, for example, will pass oxygen and nitrogen at different rates. The gas that preferentially flows through the membrane wall is called the "permeate" gas, and the gas that tends not to flow through the membrane is called the "non-permeate" or "retentate" gas. The selectivity of the membrane is a measure of the degree to which the membrane allows one component, but not the other, to pass through.

Membranes have also been used to separate air from water vapor. A membrane which permeates air and water vapor at different rates is called a dehydration membrane. Dehydration of an air stream is necessary because a membrane used for separation of air will degrade in the presence of water or water vapor. It has therefore been known to provide a gas dehydration membrane upstream of a gas-separation membrane, to provide an input stream which is substantially free of water. Examples of patents which describe the use of dehydration membranes are U.S. Pat. Nos. 7,294,174, 7,497,894, and 8,398,755, the disclosures of which are all hereby incorporated herein.

The air supplied to a membrane module is typically compressed by a compressor, which is lubricated by oil. Particles of oil, and oil vapors, may leak from the compressor, further contaminating the gas stream. Such materials must be removed to optimize performance of a gas-separation module. Carbon beds have been used, in the prior art, to remove particles of oil, and/or oil vapor, from the air stream. But excessive humidity also degrades the performance of such carbon beds, which is another reason why the air supplied to the module must be relatively dry.

It has also been known to provide heaters, moisture traps, and/or filters between the compressor and the membrane unit, as needed.

The present invention provides a dehydration membrane module which includes, at its discharge end, a filter material which is integral with the module. The device therefore provides clean, dry air which can be used as a feed gas for a gas-separation unit, or for some other purpose which requires a supply of clean and dry air.

SUMMARY OF THE INVENTION

The present invention comprises an air dehydration module which has a plurality of hollow polymeric fibers. The material of the fibers is chosen so as to have a permeability for water vapor which is different from its permeability for air. A filter pad, preferably made of activated carbon cloth, is disposed at the outlet end of the module, such that all gas flowing out of the module through the outlet end must pass through the filter pad. The filter pad and the polymeric fibers are located within the same pressure vessel, and there is no other type of polymeric fiber in the vessel.

In one embodiment, a flow orifice is provided in the module, so as to direct some of the product gas of the module towards the inlet end of the module. In this way, some of the product gas acts as a sweep gas for the module. Thus, in this embodiment, the dehydration module generates its own sweep gas.

In another embodiment, the output of the dehydration module is connected to the inlet end of a gas-separation module, and an output gas from the gas-separation module is directed back to the dehydration module, for use as a sweep gas for the dehydration module.

The present invention therefore has the primary object of providing a membrane-based air dehydration module which produces clean and dry air.

The invention has the further object of providing an economical module for making clean and dry air, for use "as is", or for use as an input to a separate air separation module.

The invention has the further object of improving the economy of producing clean and dry air for use in various applications.

The invention has the further object of substantially reducing the cost of pre-treating air before it is directed into an air separation membrane module.

The reader skilled in the art will recognize other objects and advantages of the present invention, from a reading of the following brief description of the drawings, the detailed description of the invention, and the appended claims.

BRIEF DESCRIPTION OF THE DRAWINGS

FIG. 1 provides a partially schematic, partially cut-away longitudinal cross-sectional view of the dehydration module of the present invention.

FIG. 2 provides a detailed cross-sectional view of the outlet end of the dehydration module of FIG. 1.

DETAILED DESCRIPTION OF THE INVENTION

Figure 3:
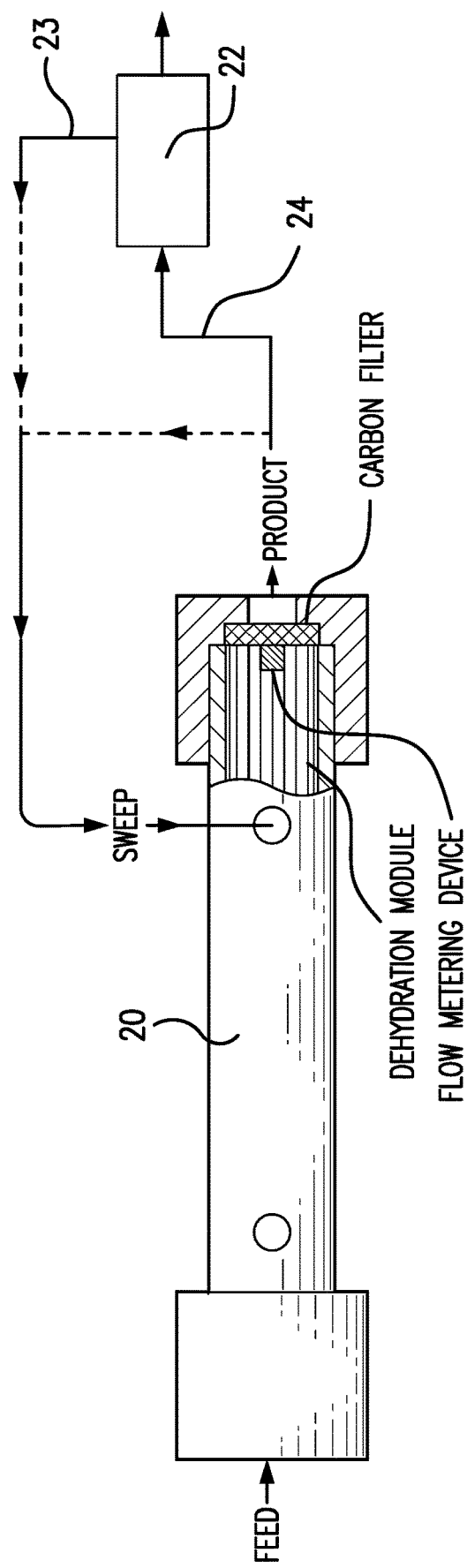
FIG. 3 provides a partially schematic, partially cut-away cross-sectional view of an alternative embodiment of the present invention, in which a sweep gas is provided by a separate air separation module.

The present invention comprises a membrane-based dehydration module having a carbon fabric pad or covering which is integral to the module, and which is positioned at the discharge end of the module, within the module housing. The invention differs from the prior art, which only discloses use of a filter as a pre-treatment for air entering the dehydration module. The output of the dehydration module of the present invention can be used "as is", in applications requiring only clean, dry air, or it could be used as a feed gas for a separate gas-separation module.

The carbon filter material is preferably a multi-layered pad made of activated carbon cloth. A preferred material for the carbon fabric is the product sold under the trademark Zorflex, by Chemviron Carbon Inc. But the invention is not limited to use of the foregoing material.

The invention also includes a flow metering device, which is a centered fixed orifice, embedded in a tubesheet near the discharge end of the module, the orifice comprising means for allowing a fraction of the dried product gas to be used as a sweep gas on the low-pressure side of the dehydration membrane module. Alternatively, permeate gas from a separate, downstream air separation module could be used as the sweep stream.

In one preferred embodiment, about 5-15% of the product gas may be used as a sweep gas. The dimensions of the orifice are chosen to allow the desired quantity of product gas to pass through. The carbon cloth filter pad is designed with sufficient volume such that the residence time of the gas, within the pad, is at least 0.05 seconds.

The invention can process compressed air that may be saturated, or nearly saturated, with both water vapor and oil vapor, the oil vapor coming from the compressor. The product gas is dry, i.e. having a dew point which is at least 10° C. less than that of the inlet gas. The product is also substantially oil free, defined as having less than 10 ppb of oil vapor. This quality of compressed air can be used "as is". The dehydration module of the present invention can comprise a compact air pre-treatment device to protect air separation membranes from exposure to water or oil, thus avoiding fouling of the membrane and prolonging its useful life.

The cost of this pre-treatment of air is minimized by the fact that both the dehydration membrane and the carbon filter cloth are located within the same pressure vessel. The cost advantage is felt especially when the systems are small, processing less than 100 lpm. A module of the present invention may reduce the overall pre-treatment cost by 50%, for a system of this size.

FIG. 1 illustrates a preferred embodiment of the present invention. A dehydration module 1 includes a plurality of hollow fibers 4, the fibers being represented schematically. In practice, the number of fibers will be very large, and not easily represented in a drawing. The feed gas, such as air, enters through inlet port 2. An output gas exits through outlet port 3. If the module is designed such that the gas flowing through outlet port 3 is retentate gas, i.e. gas which has not permeated the walls of the fibers, then the gas appearing at port 10 is the permeate gas, i.e. gas which has permeated the fibers. Depending on the application, the module could instead be designed so that the gas at outlet 3 is the permeate gas, and the gas appearing at port 10 is the retentate gas.

The fibers 4 are held within tube sheet 6. A similar tube sheet is provided near the inlet side of the module, but is not shown in the figures, for simplicity of illustration. A carbon filter pad 7 is positioned near the outlet port 3, such that gas flowing out of the module through port 3 must pass through the filter pad. The fibers, the tube sheet, and the filter pad are held within pressure vessel 12, only a portion of which is shown, again for simplicity of illustration. Thus, the filter pad is positioned within the same pressure vessel as the fibers.

A sweep insert 5, defining flow orifice 8, is provided at the center of the tube sheet 6. The insert provides a means for allowing some of the output gas to be redirected for use as a sweep gas. The detail view of FIG. 2 shows this feature more clearly. Arrows 11 and 12 show the path of the gas, as it flows into the insert and back along the length of the module.

FIG. 3 illustrates an alternative embodiment of the present invention, in which the dehydration membrane module 20 receives its sweep gas from a separate air separation module 22. The permeate stream 23 from module 22 is directed to the dehydration module to serve as a sweep gas. The output stream of the dehydration module is used as the feed stream 24 of the air separation module 22.

In both embodiments, the carbon filter pad is provided at the outlet end of the dehydration module, inside the same pressure vessel which houses the dehydration module. Also, in both embodiments, the pressure vessel contains only a dehydration membrane module and a filter pad, and does not contain any module for separation of air into gaseous components. That is, the dehydration membrane is the sole membrane present within the pressure vessel of the dehydration module.

The dehydration module is preferably fabricated to facilitate periodic replacement of the carbon cloth filter pad.

The invention can be modified in various ways, as will be apparent to the reader skilled in the art. For example, the particular details of the filter pad can be varied. The invention can be practiced with different membrane materials, provided that such materials are suitable for removing water or water vapor from a gas. Such modifications should be considered within the spirit and scope of the following claims.

What is claimed is:

1. An air dehydration module comprising a plurality of hollow polymeric fibers disposed within a pressure vessel, the fibers being selected to have a permeability for water vapor which is different from their permeability for air, the module having an inlet end, the inlet end having an inlet port for allowing air to flow into the module, the module having an outlet end, opposite to the inlet end, the outlet end having an outlet port for allowing gas to flow out of the module, the module including a filter pad made of activated carbon cloth and positioned at the outlet port and within the pressure vessel.

2. The module of claim 1, wherein the module includes a flow orifice for allowing a portion of product gas to enter the orifice, in a direction towards the inlet end, so as to function as a sweep gas for the module.

3. The module of claim 2, wherein the flow orifice has a size such that about 5-15% of product gas is directed towards the inlet end, as a sweep gas.

4. The module of claim 1, wherein the filter pad comprises a multi-layered pad.

5. The module of claim 2, wherein the filter pad comprises a multi-layered pad.

6. The module of claim 1, wherein the outlet port is connected to a conduit which conveys gas to a separate gas separation module, and wherein the gas separation module includes a port which provides a path for gas from the gas separation module to the dehydration module, so as to provide a sweep stream for the dehydration module.

7. A dehydration module comprising a plurality of polymeric fibers constructed of a material selected to have a permeability for water vapor which is different from its permeability for air, the module having an inlet end and an outlet end, the module further comprising a filter material made of activated carbon cloth and disposed at the outlet end such that all gas passing through the outlet end must flow through the filter material, the module being housed in a pressure vessel, and wherein the filter material and the polymeric fibers are both within the same pressure vessel, and wherein the polymeric fibers are the sole polymeric fibers located within the pressure vessel.

8. The dehydration module of claim 7, wherein the module includes a flow orifice for allowing a portion of product gas to enter the orifice, in a direction towards the inlet end, so as to function as a sweep gas for the module.

9. The module of claim 8, wherein the flow orifice has a size such that about 5-15% of product gas is directed towards the inlet end, as a sweep gas.

10. The module of claim 7, wherein the filter comprises a multi-layered pad.

11. The module of claim 8, wherein the filter comprises a multi-layered pad.

12. The module of claim 7, wherein the outlet port is connected to a conduit which conveys gas to a separate gas separation module, and wherein the gas separation module includes a port which provides a path for gas from the gas separation module to the dehydration module, so as to provide a sweep stream for the dehydration module.

\* \* \* \* \*